US009043071B1

(12) United States Patent
Lombrozo

(10) Patent No.: US 9,043,071 B1
(45) Date of Patent: May 26, 2015

(54) STEERING-BASED SCRUB BRAKING

(71) Applicant: Google Inc., Mountain View, CA (US)

(72) Inventor: Peter Lombrozo, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/973,154

(22) Filed: Aug. 22, 2013

(51) Int. Cl.
B62D 6/04 (2006.01)
B62D 6/00 (2006.01)
G06F 19/00 (2011.01)

(52) U.S. Cl.
CPC ............... B62D 6/001 (2013.01); G06F 19/00 (2013.01)

(58) Field of Classification Search
USPC .............. 701/41, 42, 72, 23; 180/402
See application file for complete search history.

(56) References Cited

U.S. PATENT DOCUMENTS 8,068,955 B2 * 11/2011 Yanagi ........................ 701/43
2001/0032748 A1 10/2001 Demerly
2002/0167218 A1 * 11/2002 Chubb ........................ 303/5
2010/0263961 A1 * 10/2010 Horiuchi ..................... 180/445
2012/0095660 A1 4/2012 Breuer

FOREIGN PATENT DOCUMENTS

WO 2007085751 A1 8/2007
WO 2012044210 A1 4/2012

* cited by examiner

Primary Examiner — Tan Q Nguyen
(74) Attorney, Agent, or Firm — McDonnall Boehnen Hulbert & Berghoff LLP

(57) ABSTRACT

Methods and systems for implementing steering-based scrub braking are described. A computing device or system assisting in the control of a vehicle may be configured to make a determination to reduce a speed of the vehicle or enhance the stability of a vehicle that is traveling in a given direction. The computing device may provide instructions to turn a pair of wheels or any combination of wheels of the vehicle in a direction away from parallel to the given direction in which the vehicle is traveling and in opposite directions to each other so as to reduce the speed of the vehicle. In an example, the computing device may estimate a range to execute speed reduction of the vehicle.

19 Claims, 9 Drawing Sheets

STEERING-BASED SCRUB BRAKING

BACKGROUND

Unless otherwise indicated herein, the materials described in this section are not prior art to the claims in this application and are not admitted to be prior art by inclusion in this section.

Autonomous vehicles may use various computing systems to aid in the transport of passengers from one location to another. Some autonomous vehicles may require an initial input or continuous input from an operator, such as a pilot, driver, or passenger. Other autonomous systems, for example autopilot systems, may be used when the system has been engaged, which permits the operator to switch from a manual mode (where the operator exercises a high degree of control over the movement of the vehicle) to an autonomous mode (where the vehicle essentially drives itself) to modes that lie somewhere in between.

When navigating within an environment, a vehicle may need to reduce speed or stop for numerous reasons, such as to avoid collisions or in order to properly follow speed limits. Vehicles typically slow down and stop through the utilization of a braking system. A braking system may involve friction brakes, which are a type of automotive brakes that slow or stop a vehicle by converting kinetic energy into heat energy, via friction. The heat energy dissipates into the atmosphere as the vehicle reduces speed from the loss of kinetic energy. Some vehicles may include anti-lock braking systems that allow the wheels on a motor vehicle to maintain tractive contact with the road surface while braking. Anti-lock braking may prevent wheels from locking up and avoids uncontrolled skidding of the vehicle.

SUMMARY

The present application discloses embodiments that relate to methods and systems for steering-based scrub braking.

In one example, the present application describes a method. The method may comprise making a determination, by a computing device, to reduce a speed of a vehicle that is traveling in a given direction, and the vehicle includes a pair of wheels. The method may further comprise providing instructions, by the computing device, to turn the pair of wheels of the vehicle in a direction away from parallel to the given direction in which the vehicle is traveling and in opposite directions to each other so as to reduce the speed of the vehicle.

In another example, the present application describes a non-transitory computer readable medium having stored thereon executable instructions that, upon execution by a computing device, cause the computing device to perform functions. The functions may comprise making a determination to reduce a speed of a vehicle that is traveling in a given direction, and the vehicle includes a pair of wheels. The functions may further comprise providing instructions to turn the pair of wheels of the vehicle in a direction away from parallel to the given direction in which the vehicle is traveling and in opposite directions to each other so as to reduce the speed of the vehicle.

In still another example, the present application describes a system. The system may comprise at least one processor. The system may also comprise a memory having stored thereon executable instructions that, upon execution by the at least one processor, cause the system to perform functions comprising making a determination to reduce a speed of a vehicle that is traveling in a given direction, and the vehicle includes a pair of wheels. The functions may further comprise providing instructions to turn the pair of wheels of the vehicle in a direction away from parallel to the given direction in which the vehicle is traveling and in opposite directions to each other so as to reduce the speed of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
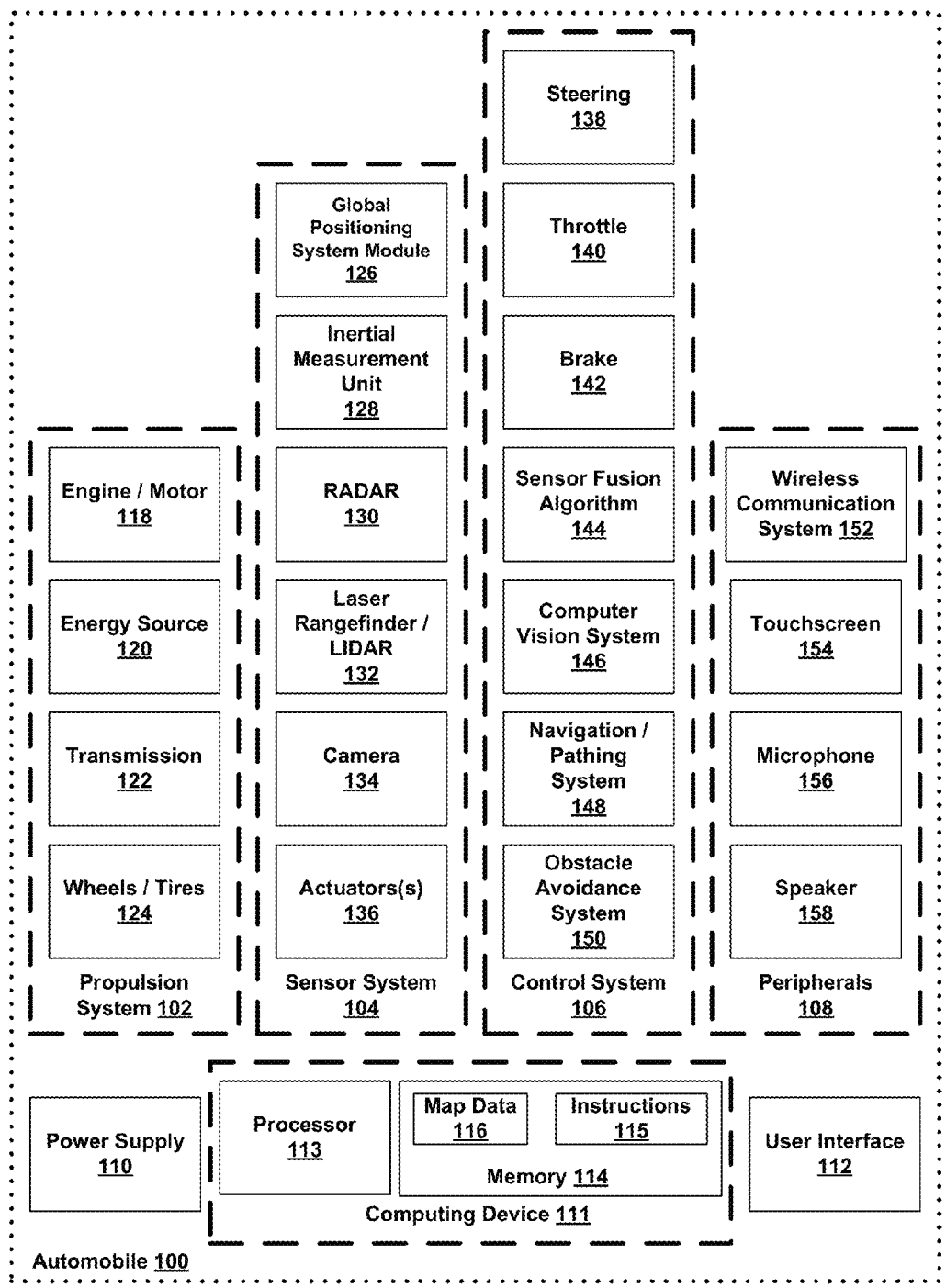
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a vehicle may be configured to reduce speed or stop through the use of steering-based scrub braking. Different types of vehicles may be equipped with possible mechanical structures and systems necessary to apply steering-based scrub braking. The various types of vehicle may be configured to operate in an autonomous or semi-autonomous mode or may rely on input from a user (e.g., a driver).

In addition, a vehicle configured to perform steering-based scrub braking may include one or more computing devices and/or systems configured to control or assist in the operation of the vehicle. The amount of control and assistance performed by computing devices may vary based on type of vehicle. For example, a vehicle may include a single computing device that autonomously operates the vehicle, including navigating without input from a driver. Likewise, a vehicle may include multiple computing devices or systems that assist in operating the vehicle. The various computing devices or systems may operate or assist with specific systems or tasks. Furthermore, a vehicle equipped with multiple computing devices may be controlled or partially controlled based on the computing devices communicating within a network or multiple networks. Additionally, example vehicles may include different software implementations and may vary on the dependency on the contributions of computing devices within different examples.

In example implementations involving a vehicle or similar entity executing steering-based scrub braking, a computing device or system associated with the vehicle (e.g., autonomous vehicle) or similar entity may be configured to determine if the vehicle should reduce speed or stop. The computing devices or systems may determine that the vehicle should reduce speed or stop based on environmental conditions, which may be determined through the use of vehicle sensors, outside entities, or other means. After determining that the vehicle may need to slow down, stop, or even improve vehicle stability during travel, a computing device associated with the vehicle may develop and providing instructions to systems of the vehicle capable of applying some form of brakes, which may include the mechanical structures capable of executing steering based scrub braking. Wired or wireless links may connect the various vehicle systems that allow a computing device or system of computers to relay a command to execute steering-based scrub braking. In some implementations, the computing device may directly control systems or components of the vehicle that may apply brakes (e.g., steering-based scrub brakes).

As noted, a computing device or system associated with a vehicle may receive and analyze information provided by various vehicle sensors to determine if the vehicle should slow down or stop. Examples of vehicles may include, but are not limited to, a global positioning system module, RADAR, LIDAR, cameras, microphones, or other types of vehicle systems. The computing device or system may determine that the vehicle should apply steering-based scrub braking in response to analyzing information provided by a combination of vehicle sensors, for example. In some instances, the vehicle may apply steering-based scrub braking in response to the information provided by a single type of sensor (e.g., LIDAR).

In addition, a vehicle may apply steering-based scrub braking based on input from a driver or another passenger. For example, a vehicle may include equipment or user-interface that enables a driver to select to cause the vehicle to execute some form of steering-based scrub braking. In one implementation, a vehicle may execute steering-based scrub braking abased on a combination of information provided by vehicle sensors and/or driver input. For example, the computing system of a vehicle may inform a driver that steering-based scrub braking is recommended based on information provided by vehicle sensors and wait until the driver approves the recommendation.

In another implementation, the computing device or system associated with a vehicle may determine that steering-based scrub braking should be executed based on various parameters that may indicate some form of brakes may be needed. Various parameters that may impact whether a vehicle applies steering based scrub braking may include the amount of time available for a vehicle to come to a stop or distance/range that the vehicle (e.g., autonomous vehicle) may have to complete slowing down or stopping. Other parameters that a computing device may determine relating to the application of steering-based scrub braking may include the computing device of vehicle determining the amount of brake-force to apply, which direction the vehicle should travel while slowing down or coming to a stop, or which wheels to reposition to execute scrub braking, etc. A computing device or system associated with a vehicle may determine other factors or parameters that may impact the application of steering-based scrub braking.

In one such example scenario that a vehicle may utilize steering-based scrub braking, the vehicle may be navigating within an autonomous or semi-autonomous mode. A computing device assisting in the operation of the vehicle may determine that a stop sign is approaching based on the direction of travel of the vehicle. The computing device may use information provided by vehicle sensors, such as RADAR, LIDAR, or cameras images, to determine the distance (e.g., 100 meters away) between the vehicle and the sign. In some instances, the computing device may also determine how much time the vehicle has prior to reaching the stop sign based on the distance and current speed of the vehicle. After determining the distance of the sign relative to the vehicle, the computing device or another computing device associated with the vehicle may determine that the vehicle should execute some form of steering-based scrub braking. The computing device may initiate various vehicle systems to apply the appropriate amount of steering-based scrub brakes to slow down and/or completely stop the vehicle in approximately 100 meters as according to the stop sign. Furthermore, the vehicle may apply the steering-based scrub braking to assist with vehicle stabilization as the vehicle slows down to stop. Utilizing steering-based scrub braking may enable the vehicle to stop at the appropriate place for the stop sign rather than stopping beyond 100 meters or well before 100 meters. Within other examples, the vehicle may respond differently based on different signs, objects, or other environmental factors. Further, a driver may command steering-based scrub braking from a vehicle in order to stop a vehicle for a stop sign or other objects.

Likewise, a vehicle may use steering-based scrub brakes in similar situations or other scenarios to enable the vehicle to stop or slow down during navigation. Other scenarios which may cause a vehicle to utilize some form of steering-based scrub braking may include other vehicles, obeying speed limits or other regulations, avoiding pedestrians, animals, or objects, or other possible situations.

In another example implementation, a vehicle (e.g., autonomous vehicle) may determine that a nearby vehicle traveling in front of the vehicle has reduced its speed. Other vehicles within the environment of a vehicle may require the vehicle to slow down or stop to avoid collisions. In response to determining that a vehicle traveling in front of a vehicle is slowing down or stopping, the autonomous vehicle may apply steering-based scrub braking based on the various parameters involved, including but not limited to, the speed of both vehicles, the distance between the vehicles, and the conditions of the road. The autonomous vehicle may use information gathered from various scenarios in order to determine parameters associated with applying steering-based scrub braking. For example, a vehicle may determine that a nearby vehicle is slowing down to execute a turn. After detecting that the vehicle is about to turn (e.g., identifying a turn signal), the vehicle may utilize steering-based scrub braking to avoid making contact with the vehicle that is about to turn.

In another example, the primary braking system of a vehicle may fail in some way, such as not responding and/or responding inadequately when commanded by the driver or an onboard controller or computer. In response to detecting a failure of the primary braking system in some way, the controller or computing device of the vehicle may apply steering-based scrub braking based on the various parameters requiring the vehicle to slow down or stop.

In order to utilize steering-based scrub braking, a computing device or system associated with a vehicle (e.g., an autonomous vehicle) may provide instructions to any vehicle systems to reposition a wheel or wheels in a direction away from parallel to the direction of travel of the vehicle. Different components or systems of a vehicle may receive signals or instructions from computing devices or systems associated with the vehicle. In one implementation, a driver may apply steering-based scrub braking directly through mechanical and/or electrical controls.

Implementations of steering-based scrub braking may involve vehicle systems repositioning or changing the orientation of at least one wheel or more wheels of the vehicle away from a parallel to the direction of travel. Repositioning may include either positioning a wheel or wheels to point inwards towards the centerline of the vehicle or outwards away from the centerline of the vehicle and/or some combination of the repositioning. By repositioning and/or altering the direction of the wheels towards or outwards from the centerline of a vehicle, the vehicle may increase the amount of friction created between the wheels of the vehicle and the road to reduce speed. Further, a wheel positioned or oriented to induce scrub braking may not contribute to the direction of travel of the vehicle in a manner that a non-repositioned wheel does. The straight wheel may likely allow the vehicle to travel without as much friction as a scrub braking wheel orientated generates.

In various implementations of steering-based scrub braking, a vehicle may vary the extent of scrub braking applied through different parameters and may be based on various factors. A vehicle may apply steering-based scrub braking using different combinations of wheels, such as utilizing a single wheel or a set of wheels to implement scrub braking. In some instances, a vehicle may apply scrub braking to a single wheel or multiple wheels to slow down, stop, or redirect the vehicle. The vehicle may apply steering-based scrub braking to any of the wheels of the vehicle. In addition, a vehicle may use some form of steering-based scrub braking to improve vehicle stability during travel.

Within example implementations, a vehicle may apply steering-based scrub braking to more than one wheel. For example, a vehicle may apply steering-based scrub braking to the back two wheels of the vehicle, front two wheels of the vehicle, or other combinations of the wheels. Furthermore, a vehicle may reposition all of its wheels to induce steering-based scrub braking. A vehicle may possibly induce steering-based scrub braking in situations that requires a high level of scrub braking (e.g., an immediate stop). Similarly, a vehicle may apply steering-based scrub braking based on a single axle of wheels or more than one axle, which may depend on the specific scenario requiring the wheels. Therefore, a vehicle may be configured to reposition wheels in various combinations of pointing inwards and outwards from the centerline of the vehicle to execute scrub braking. The vehicle may be configured to apply scrub braking based on a pairing of wheels. The pairs may be based on the wheels sharing the same axle or some other factor.

In addition, a vehicle may position a wheel or wheels at various degrees inwards or outwards from the centerline of the vehicle. Each wheel may be positioned at different degrees or similar angles as determined by a computing device or system of a vehicle. Furthermore, a user may determine the extent to apply steering-based scrub braking without any computing intervention within some implementations. A vehicle may be configured to utilize computing systems as well as user input to execute steering-based scrub braking.

Furthermore, various factors may influence the extent a vehicle may induce scrub braking, such as environment conditions, amount of space and/or range between objects/vehicle and time available for the vehicle to execute the slow down or stop. Other factors may impact the process of applying steering-based scrub braking for a vehicle as well. A computing device or system may utilize none, some, or all the possible factors to assist in determining and executing steering-based scrub braking.

In addition, a vehicle may alter the orientation of wheels (e.g., turn) to different degrees for steering-based scrub braking. For example, a vehicle may slightly reposition a wheel to face inward and/or outward from the centerline of the vehicle at small degree away from the direction parallel to the line of travel in response to a computing device determining that the vehicle should slow down gradually. Similarly, a vehicle may reposition wheels inward or outward at a higher degree away from the parallel direction of travel to induce more friction and slow down the vehicle quicker.

In some examples, a computing device associated with an autonomous vehicle may factor the speed of the vehicle to determine the degree to apply steering-based scrub braking, which may include how many wheels to reposition and to what extent should the wheels be repositioned against the direction of travel. In addition, the computing device may factor other parameters associated with the vehicle, such as the vehicle's orientation or the present condition of the vehicle's tires. The computing device may determine that balding tires may need to be used in steering-based scrub braking earlier than newer tires that may provide more friction quicker. Furthermore, a computing device or system associated with a vehicle may factor the current weather conditions of the environment when determining when and/or how to apply some form of steering-based scrub braking. For example, the computing device may determine to execute steering-based scrub braking differently in rain than in other weather conditions (e.g., sunny day). The computing device may also factor in the current temperature conditions or the incline or decline path of travel that the vehicle may be navigating. For example, a computing device may execute some form of steering-based scrub braking to a higher degree if the vehicle is traveling downhill.

In one example implementation, a computing device or system associated with the operations of a vehicle may determine a desired direction of travel of the vehicle and select a wheel or multiple wheels to execute steering-based scrub braking based on desired direction of travel for the vehicle to continue traveling or drift along. For example, an autonomous vehicle may be configured to brake in emergency situations in a direction away from the middle of the road to avoid collisions with vehicles traveling in the opposite direction. In response, an autonomous vehicle may apply steering-based scrub braking through repositioning the wheels in a manner that directs the vehicle to slow down away from the center of the road.

In addition, a computing device and/or system assisting a vehicle may determine an estimate of range of time or distance that steering-based scrub braking should be executed over. In some instances, the computing device may apply steering-based scrub braking in angular increments based on the estimated range. For example, a computing device controlling a vehicle may determine a stop sign upcoming, but at a long distance. In response, the computing device may apply the steering-based scrub brakes slowly so that the vehicle gradually comes to a stop over the determined distance. In a similar example, the computing device may determine that the vehicle should quickly slow down or stop immediately. In response, the computing device and/or system may apply steering-based scrub braking at a higher degree, which may include repositioning multiple wheels at a higher degree to slow down the vehicle. In some instances, the computing device and/or system may induce another braking system in addition to the steering-based scrub braking.

In another example implementation, a vehicle may be configured to utilize steering-based scrub braking in response to vehicle systems determining that the vehicle's primary braking system has failed or malfunctioned in some way. In some instances, the computing device may configure the vehicle to utilize some form of steering-based scrub braking as the primary braking system. Likewise, the vehicle may use scrub braking as an option among other braking systems. Further, the computing device may configure a vehicle to apply steering-based scrub to supplement another different braking system, such as anti-lock brakes, to increase the amount of braking forced applied to the vehicle. Both braking systems may be used simultaneously, for example.

Example implementations and other possibilities are not limited to autonomous vehicles, but may include semi-autonomous vehicles, autonomous vehicles, and/or other types of vehicles. Furthermore, other types of entities may be configured to use steering-based scrub braking in some manner.

In addition, example vehicles described herein serve merely possibilities with other types available as well. Vehicles may include one or more controllers and/or traditional brakes and/or computer-actuated brakes, for example. Likewise, some vehicles may include anti-lock brakes (ABS) and/or electronic stability control (ESC) for directing and controlling the brakes. Many of these systems, subsystems, and/or components of a vehicle may detect failure of another braking system, such as a primary braking system, and may send a signal to other systems or computing devices of the vehicle to trigger the steering-based scrub braking.

In addition, some vehicles may include Autonomous Cruise Control (ACC), which may include a limited set of sensor. In some instances, the ACC may detect situations that when steering-based scrub braking may be necessary.

Further, an example system may take the form of a non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon. Similarly, the computing device may determine that the vehicle should quickly slow down or stop. Other examples and applications of scrub braking may exist as well.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

I. Example Vehicle

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be traveling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
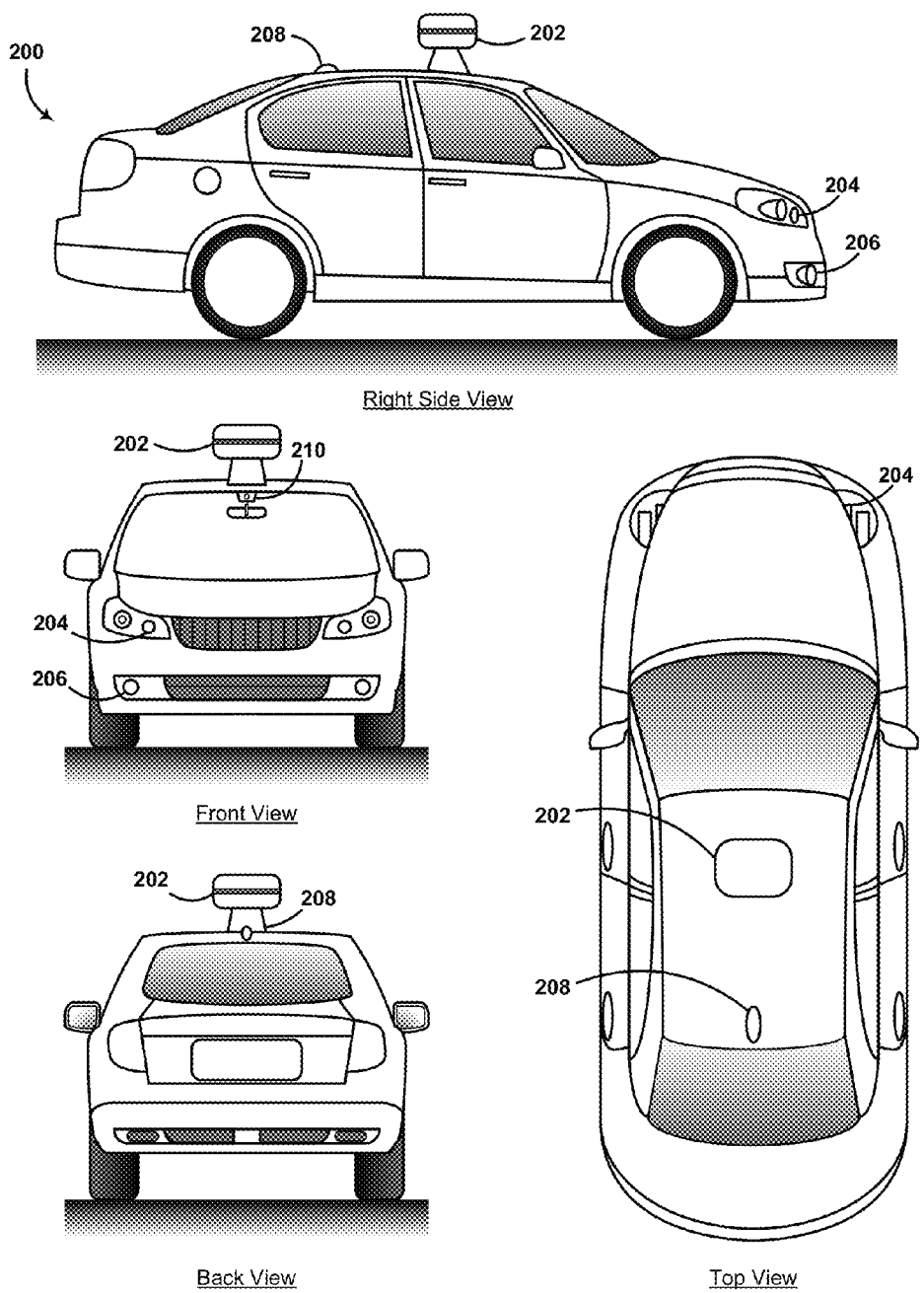
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

II. Example Method

Figure 3:
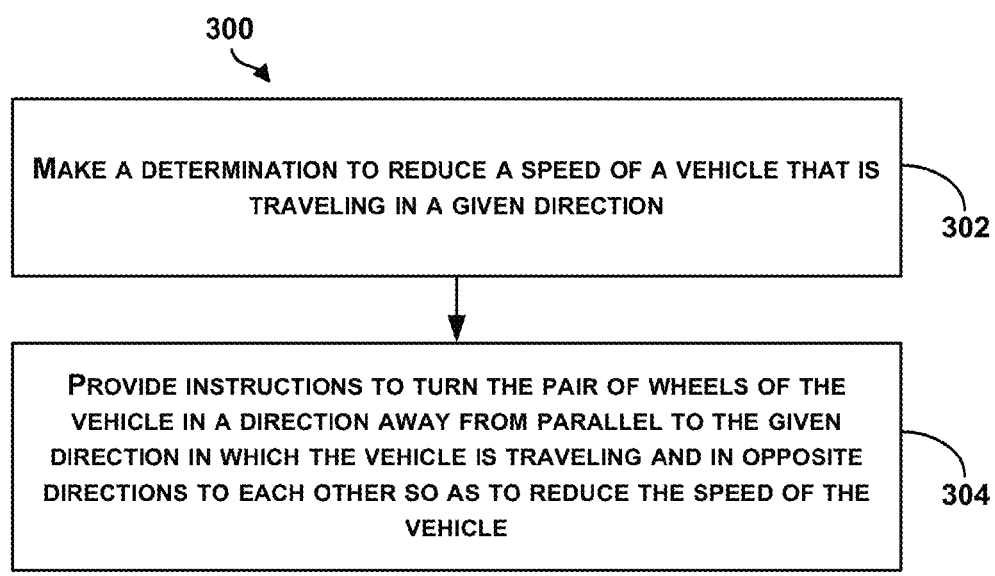
FIG. 3 is a flow chart of an example method for implementing steering-based scrub braking.

FIG. 3 is a flow chart of an example method 300 for implementing steering-based scrub braking. The method 300 may include one or more operations, functions, or actions as illustrated by one or more blocks 302-304. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes making a determination, by a computing device, to reduce a speed of a vehicle that is traveling in a given direction. A computing device and/or system associated with a vehicle (e.g., autonomous or semi-autonomous vehicle) may be configured to determine that the vehicle should requires some application of brakes to either reduce speed or come to a complete stop.

Example vehicles may include various types of computing devices or systems. A vehicle may include any number of computing devices that may communicate via a network. Each computing device and/or system may take the form of any functioning computer and may be configured to assist the vehicle with various operations. The computing device and/or system may be located on the vehicle or may communicate with the vehicle through a wireless or wired link. Furthermore, the computing device or system may assist a vehicle to perform various functions, which may include controlling or partially controlling various systems or components. Other examples of computing devices may assist in the operation and/or control of vehicles or vehicle systems.

In some examples, the computing device and/or system may receive and/or utilize information from various systems associated with the vehicle, such as RADAR, LIDAR, GPS, or other sensors, to determine if the vehicle should apply steering-based scrub brakes. In addition, the vehicle (e.g., an autonomous vehicle) may be configured to receive information from multiple systems simultaneously. The vehicle may receive information from sensors, systems, servers, other computing devices, or various other entities. The information received from the various sensors and systems of the vehicle may include details about the environment surrounding the vehicle, including information about determined distances and/or ranges between the vehicle and possible on-coming obstacles or other entities in the surrounding environment. The information obtained from systems of the vehicle may provide the computing device with assistance for determining the amount of braking forced to be applied and the overall timing to apply the brakes. In some instances, the computing device or system associated with a vehicle may receive additional information from other sources to supplement the information provided by the vehicle sensors and/or systems.

A vehicle, such as an autonomous vehicle, may utilize information pertaining to the vehicle and information related to the environment in order to assist in determining when to apply brakes, such as steering-based scrub braking. The autonomous vehicle may factor the speed of the vehicle, location, and potential path of travel, for example. In addition, the autonomous vehicle may also determine speeds of the vehicle and other surrounding objects, sizes of objects, positioning of other entities, likely paths of travel of other vehicles, and other information about objects in the environment of the vehicle.

In some implementations, a computing device and/or system may receive information in real-time to assist in determining if reducing the speed of the vehicle may be necessary. In addition, an autonomous vehicle may be configured to make the determination to reduce speed through the assistance of a network or through other communications with additional objects. For example, a stop signal may transmit a signal to an autonomous vehicle that alerts the vehicle to slow down and stop. The example situations described herein serve merely as illustrations and are not limiting.

In an example implementation, an autonomous vehicle may determine that an immediate reduction in speed is necessary to prevent a collision or another immediate hazard. A computing device or system assisting in the control and/or operations of a vehicle may need to slow down or stop the vehicle in a similar manner as a driver applying brakes to avoid a collision. The computing device or system may analyze and use information received from vehicle sensors to determine that vehicle systems should execute steering-based scrub braking. The computing device and/or system may determine the extent or degree steering-based scrub braking should be applied.

Similarly, the computing device may receive information from sensors associated with the vehicle about other environmental elements that may cause the computing device to reduce the speed of the vehicle or cause the vehicle to completely stop. Other environmental elements may include, but are not limited to, speed limits, street signs, weather conditions, vehicles or other physical objects, and pedestrians. For example, the computing device may determine that the vehicle should be slowed down in response to detecting ice on the roads, a rainy environment, or similar weather conditions.

In one example implementation, a computing device assisting or operating a vehicle may further determine that the vehicle should apply brakes in a manner that causes the vehicle to travel in a specific direction while slowing down. For example, a computing device may recognize an obstacle in the vehicle's path of travel is quickly approaching or that a collisional may occur without redirection or changing speeds of the vehicle. In response, the computing device assisting with the operations of the vehicle may determine that the vehicle should apply the brakes and slow down in a direction that avoids the obstacle. The vehicle may use steering-based scrub braking to slowing down or stopping in a specific direction.

A computing device or system associated with the operations of a vehicle may determine the amount or intensity required for executing some form of steering-based scrub braking force based on the situation at hand. The computing device or system may determine the number of wheels of the vehicle to reposition for scrub braking, what degree each wheel should be repositioned, whether to use a toe-in or toe-out position on specified wheels, and other parameters for implementing steering-based scrub braking.

In another example implementation, a computing device or systems associated with a vehicle may initially determine that steering-based scrub braking should slow down the vehicle. The computing device or systems may further determine that the vehicle should completely stop rather than simply slowing down. The computing device controlling a vehicle may be configured to constantly monitor situations to make adjustments at any period. For example, a computing device may configure a vehicle to alter the execution of steering-based scrub braking during the middle of applying brakes. In another example, a computing device may determine that only the front wheels of a vehicle should apply steering-based scrub braking, but then may determine during the slowing down process, based on changed conditions, that the back wheels should also apply scrub braking as well. Other situations of applying repositioning more or less wheels to execute steering-based scrub braking may exist as well.

In some examples, rather than a computing device operating the vehicle autonomously, a network of computing devices may be configured to cooperatively operate the various systems of the vehicle and make a determination that the vehicle should reduce speed or stop. Other examples may exist as well.

At block 304, the method 300 further includes providing instructions to turn the pair of wheels of the vehicle in a direction away from parallel to the given direction in which the vehicle is traveling and in opposite directions to each other so as to reduce the speed of the vehicle. A computing device or system associated with operating or assisting a vehicle may provide instructions to various vehicle systems that may execute the instructions and reposition one or more wheels in a position that induces some form of steering-based scrub braking. Within example implementations, a computing device or system associating with a vehicle may utilize various mechanical and/or electrical systems to execute steering-based scrub braking. Different types of vehicles may include different mechanical or electric components.

A vehicle may implement steering-based scrub braking through repositioning one or more wheels against the direction of travel. The vehicle may reposition the wheels at different orientations and during navigation, for example. The repositioning of the wheels against the current direction of travel increases the amount of friction between the vehicle and the ground causing the vehicle to slow down or stop. Further, the wheels in a scrub braking position may not rotate in the same manner as when the vehicle is traveling along the road without applying scrub braking. For example, the wheels may cease rotating in a high degree toe-in or toe-out position and thus generate primarily friction without contributing to the forward navigation of the vehicle. The vehicle may take advantage of the additional friction to slow down, stop moving completely, and/or improve vehicle stability.

In order to initiate steering-based scrub braking, a vehicle may reposition one or more wheels of a vehicle to point inwards or outwards from the centerline of a vehicle to create friction between the wheel(s) and the ground. The vehicle may reposition the wheels while the vehicle is in motion. In one example, the vehicle may consider the overall speed of the vehicle prior to applying steering-based scrub braking. In some instances, the vehicle may avoid utilizing scrub braking if the vehicle is traveling above a threshold speed.

To implement scrub braking, a vehicle may reposition wheels to point inward towards (toe-in) the centerline of the vehicle to create friction. With regards to vehicle navigation, toe, also known as tracking, is the symmetric angle that each wheel makes with the longitudinal axis of the vehicle, as a function of static geometry and kinematic and compliant effects. Toe may represent the measurement of how much the wheels point in or out from the straight-ahead position. The measurement of toe may be done in millimeters, inches or degrees, for example. The amount that the wheels point inward is toe-in. In some instances, toe-in may also be known as a positive toe position. Similarly, the wheels may be positioned by a steering system or another system of the vehicle to point outward (toe-out) away from the centerline of the vehicle to generate friction. In some instances, toe-out may also be known as negative toe position.

When a vehicle is traveling, an example ideal running toe may be zero, which means that the wheels are parallel while rolling straight ahead. In some implementations, a rear wheel drive vehicle may be configured with the front wheels slightly positioned in a toe-in position. When the vehicle moves forward, the road resistance usually causes the front wheels to spread apart or toe-out. However, in some implementations for front-wheel drive vehicles, the front wheels may be slightly positioned in a toe-out position traveling may cause the wheels to pull in slightly.

In order to execute scrub braking, a vehicle may position its wheels in various combinations, including positioning one or more wheels in a toe-in configuration while possibly positioning other wheels in a toe-out configuration. As previously discussed, a system associated with vehicle may be capable of repositioning wheels at different degrees inward or outward to induce steering-based scrub braking at different extents. For example, the mechanical steering structure of the vehicle may position the front wheels of the vehicle in a toe-in position. However, the computing device may have provided instructions to the mechanical steering structure to position one of the wheels at a greater degree inward or outward than the other wheel.

Moreover, a vehicle may be configured to mechanically execute scrub braking through different configurations or structures. For example, a vehicle may be capable of independently applying scrub braking to each various wheel of the vehicle. In this implementation, the vehicle may reposition only one wheel in a scrub braking position, all the wheels in a scrub braking position, or a combination of the wheels. The greater the toe or toe angle, the faster a tire may wear down.

The computing device may utilize information gathered from systems of the vehicle that may be used when selecting wheels to alter position in order to execute steering-based scrub braking. Information gathered from the various systems of the vehicle may enable the computing device to determine a time range for applying scrub braking, the amount of brake forced required, the direction the vehicle may need to brake towards, which wheels to reposition to apply scrub braking, and other possible information.

A computing device operating a vehicle autonomously or assisting the driver of a manually-controlled vehicle may provide instructions to different systems of the vehicle to reposition the wheel or wheels of the vehicle to induce scrub braking based on a previous determination that reducing the vehicle's speed was necessary. The vehicle may be structured in a manner that enables it to execute scrub braking with all the wheels and may be capable of utilizing scrub braking in multiple combinations involving the various wheels of the vehicle. In some implementations, a vehicle may be configured to execute steering-based scrub braking in pairs of wheels in order to promote stability and balance. For example, a vehicle may be configured to apply scrub braking to both wheels on an axle at the same time and to the same degree.

In one implementation, a computing device may be configured to provide instructions to a steering system of the vehicle to reposition one or both front wheels of the vehicle. Similarly, the computing device may alter the back wheels of the vehicle to induce steering-based scrub braking.

In some instances, a computing device may determine that a particular combination of wheel repositions may slow down the vehicle in a directive manner based on the situation. For example, a computing device may select a single wheel to implement toe-in or toe-out scrub braking. The computing device may vary the degree the wheel is rotated away or toward the vehicle centerline depending on the amount of friction the vehicle requires to slow down. For example, the computing device may reposition one or more wheels of the vehicle at a large degree towards the centerline in a toe-in position to generate a lot of friction to reduce the speed of the vehicle quicker than a lesser degree toe-in position would have enabled. The computing device may also apply vary the degree of toe-in or toe-out position of a wheel or wheels incrementally. For example, the computing device may increase the extent wheel is positioned in a toe-out position as the vehicle slows down. Inversely, the computing device may also reduce the extent a wheel is in a toe-out position as the vehicle slows down.

In an example implementation, a vehicle may be equipped various mechanical structures capable of implementing scrub braking in response to detecting a complete mechanical brake failure. The various mechanical structures may be capable of repositioning one or more wheels in a manner to implement steering-based scrub braking. In one example, a computing device may be configured to determine that a primary braking system of the vehicle has failed and based on that failure, provide instructions to a steering system of the vehicle to turn one or more wheels in the direction away from parallel to the direction of travel of the vehicle. A vehicle may be configured to position any combination of wheels in a toe-in or toe-out positioning.

In another example implementation, a computing device may apply steering-based scrub braking in response to determining an estimate of range to execute speed reduction of the vehicle. The computing device may provide instructions to turn a wheel or wheels of the vehicle in a direction away or towards the centerline of the vehicle in angular increments based on the estimate of range available. In some examples, the computing may reposition the wheels without using angular increments. In another example, a vehicle may be configured to turn wheels in pairs without being configured to turn individual wheels.

In one example, a vehicle may base the degree to which the wheels are repositioned on the speed of the vehicle or other factors. For example, a vehicle traveling at a high speeds may reposition a wheel or wheels at smaller angles to prevent too much veering of the vehicle. Similarly, a vehicle may reposition the wheels at larger degrees if the vehicle is traveling at a low speed. In other examples, a computing device may factor the path of travel of the vehicle prior to inducing steering-based scrub braking. For example, a computing device may determine that a vehicle executing a turn. In response, the computing device may apply scrub breaking based on the vehicle executing a turn. In some instances, the computing device may wait to implement steering-based scrub braking until the vehicle stops turning.

In some examples, a vehicle may be controlled by a driver and may utilize steering-based scrub braking. The vehicle may allow a driver to select which wheels that should perform scrub braking. Further, the scrub braking may be in addition to a different braking system. In some implementations, a vehicle may utilize steering-based scrub breaking as a parking brake.

III. Example Implementations

Figure 4A:
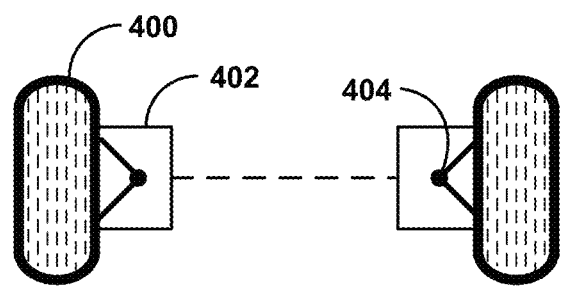
FIG. 4A is a conceptual illustration of an example mechanical structure for implementing steering-based scrub braking.
Figure 4B:
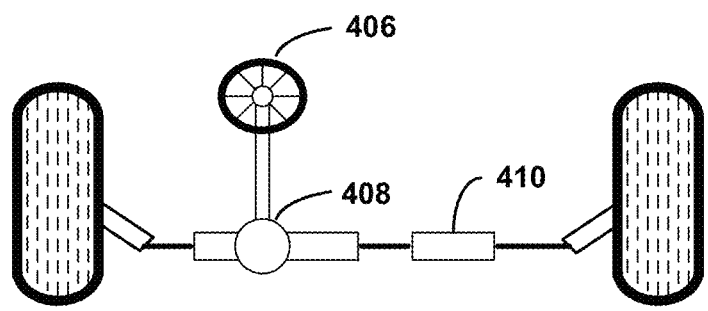
FIG. 4B is another conceptual illustration of an example mechanical structure for implementing steering-based scrub braking.
Figure 4C:
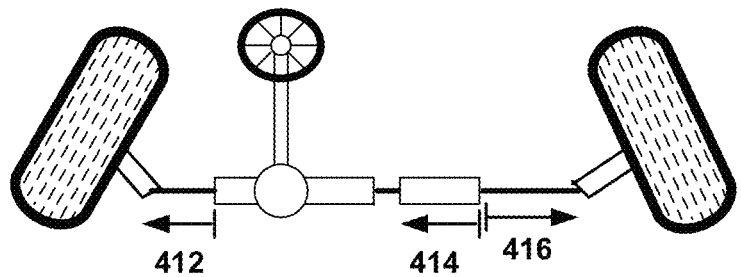
FIG. 4C is another conceptual illustration of an example mechanical structure for implementing steering-based scrub braking.

FIGS. 4A-4C illustrate example conceptual illustrations of mechanical structures for implementing steering-based scrub braking. The various example mechanical structures may be part of a vehicle, such as vehicle 100 and vehicle 200. In other examples, vehicles may utilize other structures capable of implementing steering-based scrub braking as well.

In some implementations, the mechanical structures shown within the FIGS. 4A-4C may be linked to other structures or components that may receive instructions to apply scrub braking. Within the other structures, additional electrical or mechanical components may be included. In other implementations, other mechanical or electronic structures for steering-based scrub braking may exist as well.

To execute steering-based scrub braking, various systems may be capable of executing steering-based scrub braking. A vehicle may utilize one or more systems, including but not limited to the brake system, emission system, engine, transmission, steering and suspension, filters and fluids, or other systems to implement steering-based scrub braking. An autonomous vehicle or semi-autonomous vehicle may receive assistance from a computing device or system and/or controller.

In some implementations, electronic components may be utilized to reposition any wheels of a vehicle to induce steering-based scrub braking. During execution, mechanical and/or electronic structures may work cooperatively or systematically in order to execute steering-based scrub braking to slow or stop a vehicle. A properly operating brake system helps ensure safe vehicle control and operation under a wide variety of conditions.

FIG. 4A illustrates an example conceptual illustration of a mechanical structure for implementing steering-based scrub braking, which includes independent steering actuators on each wheel. The example shown FIG. 4A includes only a small portion of a vehicle displaying possible front or back wheels including wheel 400, steering actuators including steering actuator 402, and pivots including pivot 404. The mechanical structure shown in FIG. 4A may be a minor portion of a larger structure capable of implementing steering-based scrub braking. A vehicle equipped with independent steering actuators on each wheel, as shown in FIG. 4A, may be capable of positioning wheels individually in various combinations to induce steering-based scrub braking. The mechanical portions may include different materials and/or may take the form of other structures. Further, each mechanical portion may be replaced by other materials, structures, or other alterations.

The wheel 400 may represent any of the wheels of a vehicle and may connect to other wheels via axles. For example, in a traditional four-wheel vehicle, the wheel 400 may represent any of the four wheels. Similarly, the wheel 400 may additionally represent other entities of a vehicle, including navigational portions of a boat or other structures on other modes of transportation. Other types of vehicles may include additional or less axles that may be capable of performing steering-based scrub braking.

In implementations, a tire may be a ring-shaped covering that fits around a wheel's rim to protect the rim and enable the vehicle to travel and may be made from various materials, including but not limited to synthetic rubber, natural rubber, fabric and wire, carbon black, or other materials and/or chemical compounds. The wheel 400 of a vehicle may include a tire, which may include various types of grooves and treads to increase friction for braking and performance. In some implementations, a wheel may be equipped with special treading that further enhances steering-based scrub braking. Other example of wheels may be utilized by a vehicle to execute steering-based scrub braking as well.

A steering actuator, such as steering actuator 402, is a device used to assist with the steering of a vehicle. The vehicle may comprise different types of steering actuators, such as a double-ended, hydraulic ram that is able to push out both ends of the device. Various types of vehicles, such as boats, automobiles, and farm tractors, may include the use of one or more steering actuator. In some implementations, steering actuators may be configured to work with rack-and-pinion steering systems. The actuators may be configured using various metals or other type of metals.

Pivot 404 represents possible pivots that may be utilized in a structure capable of implementing steering-based scrub braking. The pivots associated with each wheel may allow a vehicle to reposition the wheels in a configuration that induces friction through scrub braking. For example, a vehicle may move the steering pivots to keep the tie rods in their existing locations to make the wheels position in toe-in position.

In an example system, a vehicle may be configured through mechanical control of the steering system to allow the steering wheels of the vehicle (e.g., front or back wheels) to be independently controlled. The independent actuators shown in FIG. 4A allow the vehicle to implement steering-based scrub braking independently.

FIG. 4B is another example conceptual illustration of a mechanical structure for implementing steering-based scrub braking. The example shown in FIG. 4B includes steering wheel 406, steering rack 408, and extending actuator 410. The steering wheel 406 may be connected to the steering rack 408 through rack-and-pinion steering. A rack-and-pinion gear set is enclosed in a metal tube, with each end of the rack protruding from the tube. A rod, called a tie rod may connect to each end of the rack. The pinion gear may attach to the steering shaft of the steering wheel 406. A rack-and-pinion gear set may allow the conversion of rotational motion of the steering wheel into the linear motion needed to turn the wheels. Similarly, it may provide a gear reduction that simplifies turning the wheels. The rack-and-pinion gear set may be modified with some changes in example implementations. Additional components may be included with the rack-and-pinion gear set as well.

The steering wheel 406 shown in FIG. 4B may be configured to automatically execute commands related to navigation of the vehicle or steering-based scrub braking. In some examples, an autonomous vehicle may be configured with a single actuator for normal steering plus an additional actuator to provide an offset to one of the wheels. The additional configuration may allow the vehicle to mechanically implement steering-based scrub braking. An autonomous vehicle may be configured to control the direction of navigation of the vehicle through autonomous control of the steering system and/or other systems.

In another example, a vehicle may be configured with a single actuator for normal steering plus an additional actuator to provide an offset to both of the wheels. The single actuator may be configured to allow the vehicle to execute steering-based scrub braking. The vehicle may also be equipped with tie rods that link the wheels to the rack-and-pinion steering equipment. Other mechanical or electrical components may be included as well.

In an additional implementation for a vehicle with a traditional steering rack, the vehicle may be configured to shift the mounting point of the rack relative to the vehicle chassis to execute steering-based scrub braking. In the case that the rack is aft of the axle centerline and the tie rods are angled towards the front of the vehicle, as the rack mount moves forward, the wheel rods may straighten out to effectively reposition both wheels to a toe-in position.

FIG. 4C is another example conceptual illustration of a mechanical structure for implementing steering-based scrub braking. The example shown in FIG. 4C illustrates different movements represented by arrows 412-416 that signal the changes in the structural equipment to execute a toe-in alteration of both front wheels of a vehicle. Other structural changes may exist as well. Further, in other implementations, the structure shown in FIG. 4C may be altered to cause the wheels to reposition in a toe-out position.

The various movements represented by arrows 412-416 illustrate one possible implementation of a vehicle executing a toe-in positioning of the front wheels. Mechanical portions of the steering system may be capable of extending or detracting in order to cause a wheel or wheel to be positioned in a toe-in or toe-out position. In the example, the arrow 412 represents an extension of a tie rod extending from the rack coupled to the steering wheel. The tie rod may be capable of extending or decreasing based on movements generated through the steering system. The arrow 414 represents a shift of the extending actuator to enable the wheels to be altered into a toe-in position. Further, arrow 416 represents a tie rod extending from the extending actuator to allow the position of the wheel to be changed. The arrows represent example movements, but other movements may also occur to allow the vehicle to execute toe-in or toe-out braking. Other movements may exist utilizing other mechanical structures as well.

Figure 4D:
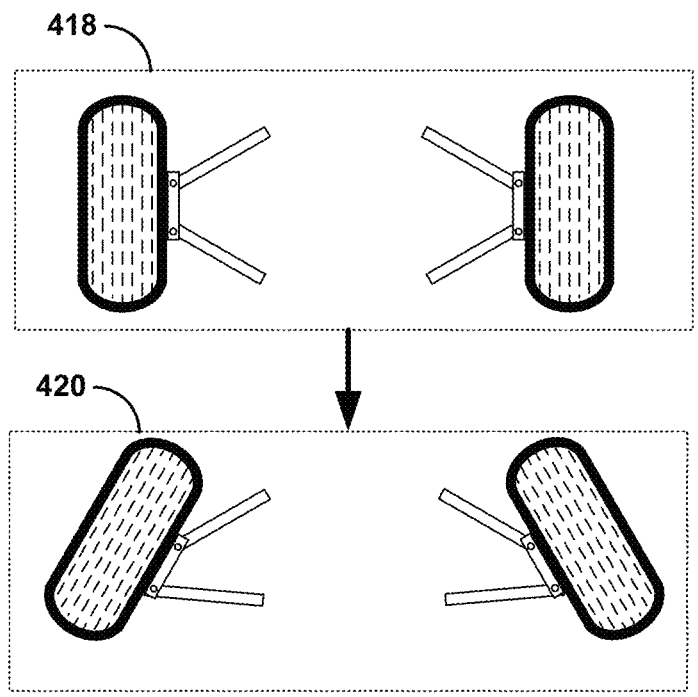
FIG. 4D is another conceptual illustration of example mechanical structures for implementing steering-based scrub braking.

FIG. 4D shows a conceptual example illustration of toe control links that may be used to manipulate the position of wheels. In one example, the toe control links may be positioned by an autonomous vehicle in a manner that causes the wheels to point inward or outward. The toe control links may be utilized on any wheel of the vehicle. In some instances, the back wheels of the vehicle may utilize the toe control links while the front wheels are positioned on a different mechanical structure.

A vehicle may be configured to move or position the control links of a vehicle in order to induce steering-scrub braking. A vehicle may include additional control links or less control links capable of changing a wheel into a toe-in or toe-out position at various degrees. A control link may be coupled to a steering arm or tie rods in some examples.

Within the example shown in FIG. 4D, the top illustration 418 shows the wheels of a vehicle in a normal orientation that is used to drive in a straight forward path. The control links are positioned in a manner that keep the wheels straight as the vehicle travels. The bottom illustration 420 shows the control links in different positions to manipulate the wheels into a toe-in position. In other examples, the control links may be repositioned by a vehicle in a manner that causes the wheels to be positioned in toe-out position. Further, a computing device may cause the steering system or another system of the vehicle to position the control links in a manner that increase or decreases the degree the wheels are executing scrub braking. In one example implementation, a vehicle may alter the position of the control links of only one wheel so that only one wheel is executing steering based scrub braking.

A vehicle may be equipped with electronic stability control (ESC) that may improve the safety of the vehicle by selectively applying the brakes of one or more of the wheels in order to help navigate the vehicle in the intended path of travel. In some instances, a vehicle may apply braking to counter over-steer or under-steer of the wheels during navigational travel. In one implementation scrub braking can be used to increase the friction of one of the wheels to implement the ESC functionality.

FIGS. 5A-5D include example conceptual illustrations of steering-based scrub braking. The examples display four wheels connected by dotted lines representing the mechanical body-structure of the vehicle, which may connect and assist in controlling the wheels. The dotted lines serve merely for illustration purposes and may be replaced by various vehicle frames. Furthermore, the example configurations shown within FIGS. 5A-5D are by no means limiting, but serve as possible representations of steering-based scrub braking with other implementations and configurations of steering-based scrub braking being possible.

Figure 5B:
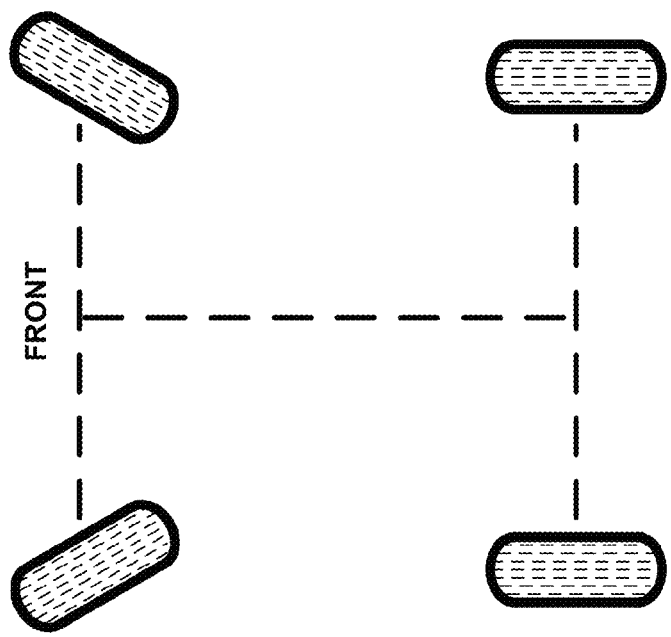
FIG. 5B is another conceptual illustration of example steering-based scrub braking.
Figure 5A:
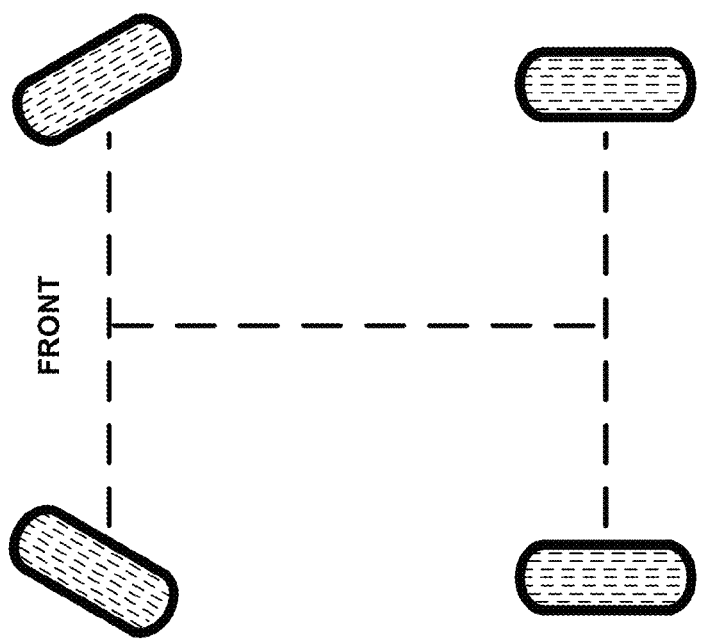
FIG. 5A is a conceptual illustration of example steering-based scrub braking.

FIG. 5A shows an example conceptual illustration of steering-based scrub braking, which includes the front two wheels of the vehicle in a toe-in position. The example illustrates one of many possible vehicle configurations with both front wheels in a toe-in position at a non-specified degree. As shown in such an configuration, a computing device and/or system assisting in the operation of a vehicle may be configured to provide instructions to the steering-system and/or other vehicle systems to reposition the wheels in a toe-in position to induce steering-based scrub braking, which may slow down the vehicle, stop the vehicle, and/or improve vehicle stability during navigation. The vehicle's computing devices or systems may provide instructions to execute steering-based scrub braking specifically using a toe-in method on the front axle to one or more mechanical and/or electronic systems of the vehicle. Within the instructions, the computing device or system may cause the steering system or another system to reposition the wheels immediately and/or through incremental alterations until the wheels are positioned in a toe-in manner as requested by the computing device.

Further, the computing device or system associated with the vehicle may provide instructions that specify a period of time or a range over which, the systems of the vehicle should execute and complete repositioning the wheels to the calculated scrub positioned. The computing device or system may also specify the angles that each of the wheels should turned toward the center of the vehicle.

Similarly, the computing device or system may be configured to provide instructions to reposition one or more wheels in the toe-in position or other positions during a determined time range or distance range. The computing device may take into account factors within the environment to determine how much time or the degree of repositioning of the wheels that the vehicle may execute. As shown by FIGS. 4A-4C, a vehicle may reposition the wheels through the use of different mechanical and/or electronic structures/components, which may include independent wheel actuators or a traditional steering rack, for example. A vehicle may experience a stabilizing effect from utilizing scrub braking from positioning the front wheels in a toe-in position. The stabilizing effect is likely to keep the vehicle pointed in the direction of travel.

FIG. 5B is another example conceptual illustration of steering-based scrub braking. The example shown in FIG. 5B illustrates the front two wheels of a vehicle at a toe-out position. Similar to the example shown in FIG. 5A, a computing device may be configured to provide instructions to reposition one or more wheels of a vehicle into a toe-out position. A toe-out position involves altering the position of the wheel to point outward in order to create friction. In some implementations, a vehicle may be configured to alternate between toe-in and toe-out positions. Further, the vehicle may be capable of positioning a wheel or wheels at different degrees of toe-out configuration. For example, a vehicle may increase the amount a wheel or wheels are positioned in the toe-out configuration to increase the amount of friction created to reduce the speed of the vehicle quicker.

Figure 5D:
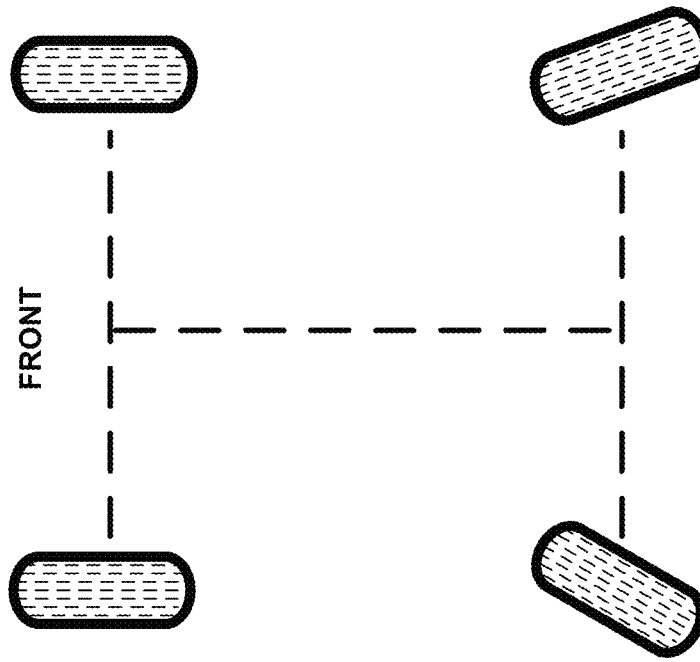
FIG. 5D is another conceptual illustration of example steering-based scrub braking.
Figure 5C:
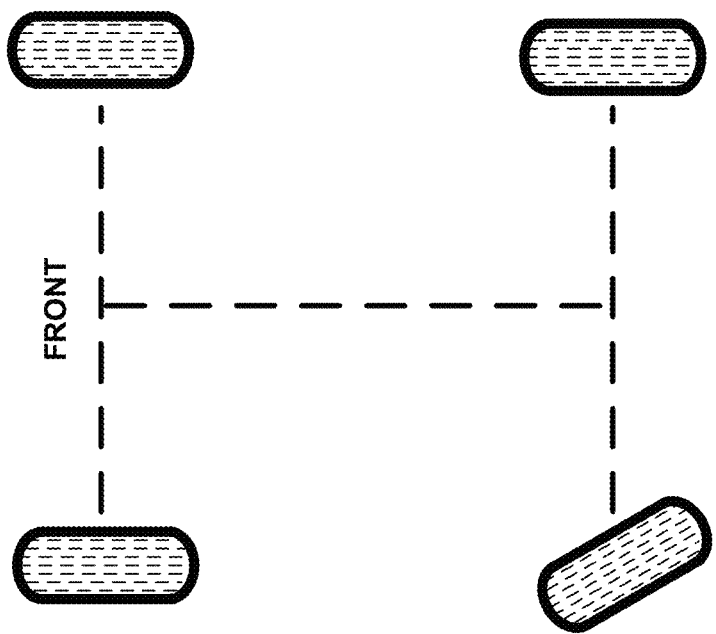
FIG. 5C is another conceptual illustration of example steering-based scrub braking.

FIG. 5C is another example conceptual illustration of steering-based scrub braking. The example shown in FIG. 5C illustrates a single back wheel at a toe-out position. Similar to the other positions, the vehicle may be capable of slowing down or braking due to the friction generated by a single wheel being repositioned in a toe-in or toe-out position. Although FIG. 5C illustrates the back left wheel in the toe-out position, other configurations may include a single other wheel in a toe-in or toe-out position. A computing device or system assisting in the operation of a vehicle may select which wheel or wheels to induce steering-based scrub braking based on environment conditions or other determinations.

FIG. 5D is another example conceptual illustration of steering-based scrub braking. The example shown in FIG. 5D illustrates a vehicle with both back wheels at a toe-in position. In a manner similar to the front wheels, a vehicle may be capable of repositioning one or both back wheels in a toe-in or toe-out position. In the example illustrated by FIG. 5D, both of the back wheels are in a toe-in position. In other examples, the back wheels may be repositioned in a toe-out position pointing away from the center of the vehicle. Similarly, a computing device may choose to reposition the wheels in a manner that induces scrub braking and directs movement of the vehicle.

IV. Example Scenarios

Figure 6A:
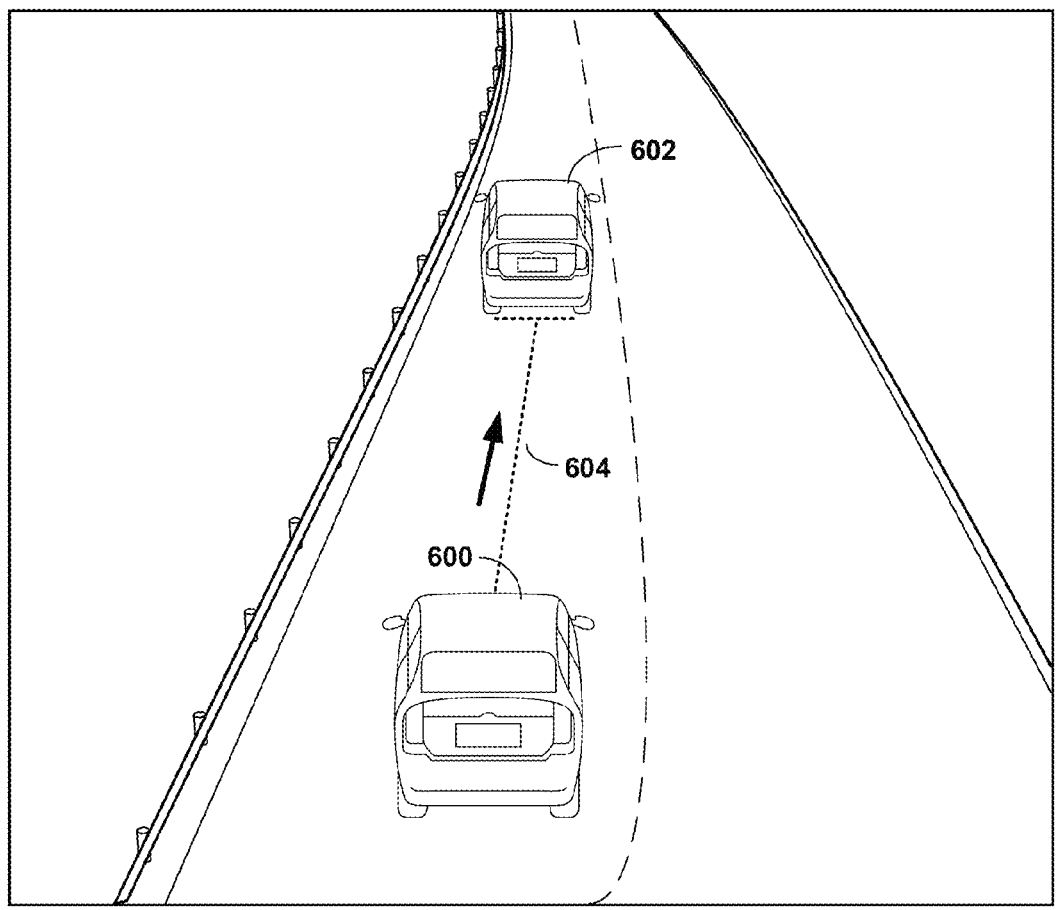
FIG. 6A is a conceptual illustration of an example implementation of steering-based scrub braking, which in this instance, is in response to the actions of another vehicle.
Figure 6B:
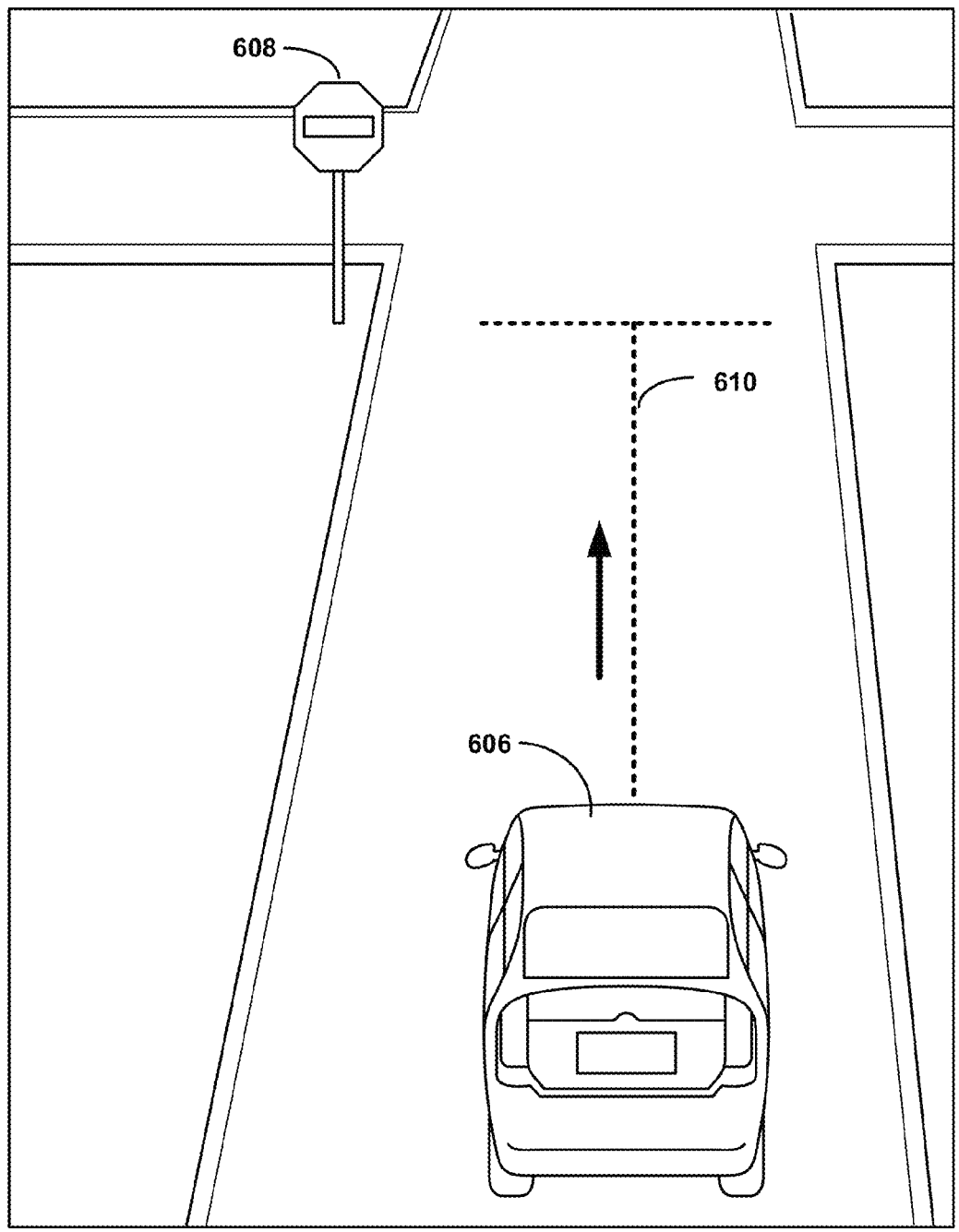
FIG. 6B is a conceptual illustration of an example implementation of steering-based scrub braking, which in this instance, is in response to detecting a sign.

FIGS. 6A-6B show conceptual illustrations of example implementations of steering-based scrub braking. Within the described examples and possible other scenarios, a vehicle may be configured to determine the necessity of slowing down or stopping and in response, apply steering-based scrub braking to one or more wheels. A computing device or system may assist the vehicle with identifying the requirement of inducing steering-based scrub braking and the execution of the steering-based scrub braking.

The example conceptual illustrations shown in FIGS. 6A-6B serve as examples and are not meant to be limiting. Other example implementations of steering-based scrub braking may exist as well for other possible scenarios, which may include slowing a vehicle prior to entering a corner or executing a turn, or applying steering-based scrub braking during a mid-corner if a computational system monitoring the vehicle determines that braking may be necessary or helpful for navigating the corner. Similarly, a vehicle may be equipped to apply asymmetrical scrub braking, which may provide beneficial steering forces in addition to the braking forces created.

FIG. 6A shows an example conceptual illustration of implementing steering-based scrub braking, which in this instance, is in response to the actions of another vehicle. The example shown within FIG. 6A includes a vehicle 600, which is traveling behind a vehicle 602 on a slightly curved-road. In addition to the two vehicles, the example also shows a dotted line that may represent the distance 604 between autonomous vehicle 600 and the vehicle 602. The arrow along the dotted line is included to show the direction of travel of the vehicle 600.

In one possible scenario as shown within FIG. 6A, the vehicle 600 may have been traveling behind vehicle 602 and determined that a reduction in speed is necessary to avoid colliding into the back of vehicle 602. The vehicle 600 may have determined that applying brakes, such as steering-based scrub brakes, may be necessary to avoid crashing into the vehicle 602. In some instances, a computing device, system or user input that directs the vehicle 600 to apply some form of brakes may be based at least in part on the distance 604 between the vehicles.

In order to implement steering-based scrub braking, the vehicle 600 may include one or more computing devices or systems capable of determining that the vehicle should reduce its speed or completely stop based on information provided by vehicle sensors, systems, and/or user input. In some implementations, the vehicle may be actively controlled by a driver and use a computing device to assist the driver in navigation. The vehicle 600 represents any type of vehicle, including vehicle 100 and vehicle 200 discussed in FIGS. 1-2.

A computing device or system assisting with operating the vehicle 600 may determine that the other vehicle, vehicle 602, had slowed down or is traveling a slower speed than the current speed of vehicle 600. Based on a potential collision with vehicle 602 or other reasons, the computing device or system may determine that a reduction in the speed of vehicle 600 is necessary. For example, in one possible scenario, the computing device or system of vehicle 600 may determine that the vehicle 602 is braking and determine brakes should be applied. A driver may also provide commands to the vehicle indicating that the vehicle 602 is breaking or interfering in the path of travel of the vehicle 600 in some other way. Other reasons for vehicle 600 to implement steering-based scrub braking may exist as well.

The vehicle 600 may be configured to apply scrub braking in response to receiving information from one or more systems of the vehicle about the surrounding environment. For example, the vehicle 600 may receive information from a LIDAR unit, RADAR, GPS, or other sensors that allows a computing device to determine whether to implement steering-based scrub braking. The information received may also impact the amount of scrub braking implemented or the timing for applying the brakes. For example, a computing device may provide instructions to apply scrub braking to all the wheels of a vehicle in a scenario that requires an immediate stopping for the vehicle.

In the example illustrated by FIG. 6A, the vehicle 600 may determine a distance 604 between vehicle 600 and vehicle 602. The vehicle 600 may determine the distance between the vehicle 600 and the vehicle 602 through the use of LIDAR or RADAR, for example. In addition, a computing device or system associated with operating the vehicle 600 may factor the speed of both vehicles to determine an amount of time that vehicle 600 has to apply scrub braking to slow down to avoid a collision and continue traveling safely. The vehicle 600 may determine that the distance 604 is shrinking and in response, apply steering-based scrub braking to keep the distance between the vehicles.

In another example, the vehicle 600 may determine that vehicle 602 has come to a complete stop or stalled. The vehicle 600 may apply scrub braking immediately to one or more wheels in order to avoid a collision. In some instances, the vehicle 600 may apply steering-based scrub braking in response to determining that another braking system of the vehicle has failed or in addition to the other brakes.

FIG. 6B shows another example conceptual illustration of implementing steering-based scrub braking, which in this instance, is in response to detecting a sign. The example shown in FIG. 6B includes a vehicle 606 that may utilize steering-based scrub braking to stop in response to detecting the sign 608. In some similar scenarios, the vehicle 606 may slow down using scrub braking in response to detecting the sign 608, depending on the type of sign.

A vehicle may receive information from one or more systems of the vehicle that identify the sign 608. In some implementations, the vehicle 606 may detect and determine the purpose of the sign 608. The vehicle 606 may determine a distance between the sign 608 and the vehicle.

In one example, the vehicle 606 may determine that the sign 608 is a stop sign. In response, the vehicle 606 may implement steering-based scrub braking to stop at the proper position for the sign 608. In other examples, the sign 608 may represent other types of signs, such as a yield sign, a warning sign, speed limit sign, etc.

In an example, the computing device of vehicle 606 may first attempt to apply a different type of braking mechanism prior to executing steering-based scrub braking. Similarly, the computing device may also apply scrub braking in addition to another type of braking mechanism. For example, the vehicle may stop utilizing both brake pads and steering-based scrub braking.

The computing device may utilize incoming information to determine the amount of time the vehicle has available prior to reaching the stop sign at the current rate the vehicle is traveling and apply the brakes accordingly. For example, the computing device may factor in the amount of friction and/or traction occurring between the wheels of the vehicle and the road in order to determine the extent to apply steering-based scrub braking.

In one example, the vehicle 606 may first attempt to use a primary braking system and utilize steering-based scrub braking in response to the failure of the primary brake system. Similarly, the vehicle may be capable of utilizing steering-based scrub braking in addition to other braking systems.

The computing device may determine that the device has a specific distance represented by the dotted line 610 to execute the slowing down and stopping of the vehicle. The dotted line 610 may represent a distance in some measurable unit or may represent a time range that a computing device may utilize to determine the degree of scrub braking required to accommodate the demands of the environment. The vehicle may determine distance 610 prior to executing steering-based scrub braking. The vehicle may utilize the distance 610 to determine the amount of steering-based scrub braking to apply and which wheels should apply scrub braking, for example. A vehicle may be configured to execute steering-based scrub braking for the distance shown by line 610 or may use more or less distance.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
    making a determination, by a computing device controlling a vehicle in an autonomous mode, to reduce a speed of the vehicle that is traveling in a given direction in the autonomous mode, wherein the vehicle includes a pair of wheels;
    determining, by the computing device, an estimate of a range over which to reduce the speed of the vehicle; and
    providing instructions, by the computing device, to turn the pair of wheels of the vehicle in a direction away from parallel to the given direction in which the vehicle is traveling and in opposite directions to each other in angular increments based on the estimate of the range so as to reduce the speed of the vehicle.

2. The method of claim 1, wherein providing the instructions to turn the pair of wheels of the vehicle in the direction away from parallel to the given direction in which the vehicle is traveling comprises providing instructions to turn a pair of rear wheels of the vehicle.

3. The method of claim 1, wherein the vehicle is configured to operate in an autonomous mode.

4. The method of claim 1, wherein providing instructions to turn the pair of wheels of the vehicle in the direction away from parallel to the given direction in which the vehicle is traveling comprises providing instructions to turn the pair of wheels of the vehicle inward.

5. The method of claim 1, wherein providing instructions to turn the pair of wheels of the vehicle in the direction away from parallel to the given direction in which the vehicle is traveling comprises providing instructions to turn the pair of wheels of the vehicle outward.

6. The method of claim 1, wherein providing the instructions to turn the pair of wheels of the vehicle in the direction away from parallel to the given direction in which the vehicle is traveling comprises:
    providing instructions to turn a first front wheel of the vehicle; and
    providing instructions to turn a second front wheel of the vehicle in a direction opposite that of the first front wheel.

7. The method of claim 6, wherein providing the instructions to turn the first front wheel and the second front wheel comprises providing instructions to turn the first front wheel and the second front wheel toward each other.

8. The method of claim 6, wherein providing the instructions to turn the first front wheel and the second front wheel comprises providing instructions to turn the first front wheel and the second front wheel away each other.

9. The method of claim 1, further comprising:
    determining that a primary braking system of the vehicle has failed; and
    based on failure of the primary braking system, providing the instructions to turn the pair of wheels of the vehicle in the direction away from parallel to the given direction in which the vehicle is traveling.

10. The method of claim 1, further comprising:
    determining a desired direction of travel of the vehicle; and
    providing instructions to turn a right or left front wheel of the vehicle in a selected direction based on the desired direction.

11. The method of claim 1, further comprising:
    determining a speed of the vehicle; and
    based on the speed of the vehicle, determining an angle at which to turn the pair of wheels of the vehicle in the direction away from parallel to the given direction in which the vehicle is traveling.

12. A system, comprising:
    at least one processor; and
    a memory having stored thereon instructions that, upon execution by the at least one processor, cause the system to perform functions comprising:
        making a determination to reduce a speed of a vehicle that is traveling in a given direction in an autonomous mode, wherein the vehicle includes a pair of wheels;
        determining an estimate of a range over which to reduce the speed of the vehicle; and
        providing instructions to turn the pair of wheels of the vehicle in a direction away from parallel to the given direction in which the vehicle is traveling and in opposite directions to each other in angular increments based on the estimate of the range so as to reduce the speed of the vehicle.

13. The system of claim 12, wherein providing the instructions to turn the pair of wheels of the vehicle in the direction away from parallel to the given direction in which the vehicle is traveling comprises providing instructions to turn a pair of rear wheels of the vehicle.

14. The system of claim 12, wherein providing instructions to turn the pair of wheels of the vehicle in a direction away from parallel to the given direction in which the vehicle is traveling and in opposite directions to each other so as to reduce the speed of the vehicle comprises providing instructions to turn one wheel of the vehicle.

15. The system of claim 12, wherein providing instructions to turn the pair of wheels of the vehicle in a direction away from parallel to the given direction in which the vehicle is traveling and in opposite directions to each other so as to reduce the speed of the vehicle comprises providing instructions to turn all wheels of the vehicle different amounts or directions away from parallel to the given direction in which the vehicle is traveling.

16. A non-transitory computer readable medium having stored thereon instructions that, upon execution by a computing device, cause the computing device to perform functions comprising:
    making a determination to reduce a speed of a vehicle that is traveling in a given direction in an autonomous mode, wherein the vehicle includes a pair of wheels;
    determining an estimate of a range over which to reduce the speed of the vehicle; and
    providing instructions to turn the pair of wheels of the vehicle in a direction away from parallel to the given direction in which the vehicle is traveling and in opposite directions to each other in angular increments based on the estimate of the range so as to reduce the speed of the vehicle.

17. The non-transitory computer readable medium of claim 16, wherein providing instructions to turn the pair of wheels of the vehicle in the direction away from parallel to the given direction in which the vehicle is traveling comprises providing instructions to turn the pair of wheels of the vehicle inward.

18. The non-transitory computer readable medium of claim 16, wherein providing instructions to turn the pair of wheels of the vehicle in the direction away from parallel to the given direction in which the vehicle is traveling comprises providing instructions to turn the pair of wheels of the vehicle outward.

19. The non-transitory computer readable medium of claim 16, wherein providing instructions to turn the pair of wheels of the vehicle in a direction away from parallel to the given direction in which the vehicle is traveling and in opposite directions to each other so as to reduce the speed of the vehicle comprises providing instructions to turn one or more wheels of the vehicle in a direction away from parallel to the given direction in which the vehicle is traveling to maintain or regain stability during a loss of traction or control situation.

* * * * *